July 2, 1957 — E. E. SHELDON — 2,798,179
SYSTEM FOR REPRODUCING INVISIBLE IMAGES
Filed Jan. 23, 1952 — 2 Sheets-Sheet 1
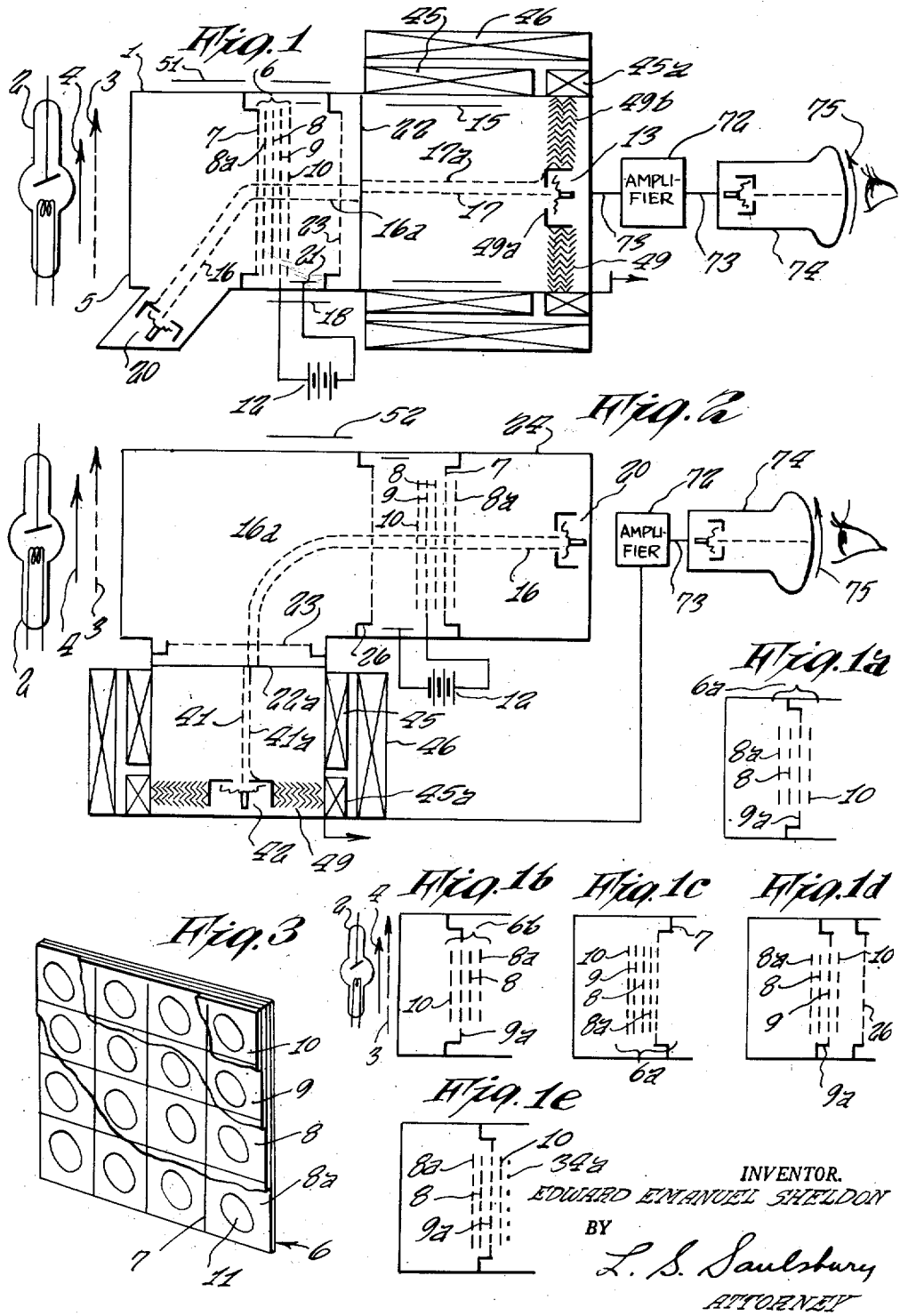
INVENTOR.
EDWARD EMANUEL SHELDON
BY L. S. Saulsbury
ATTORNEY

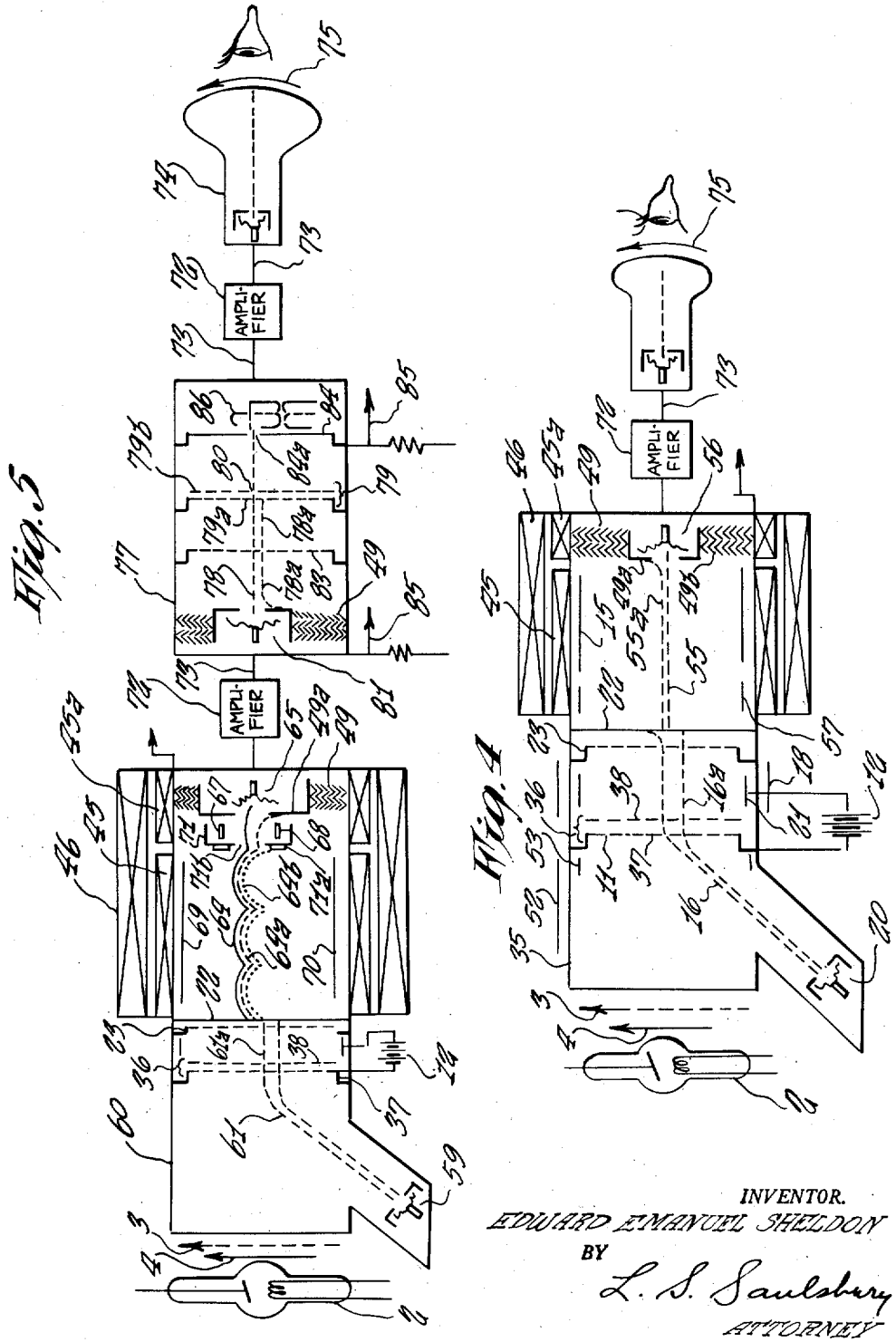

2,798,179
Patented July 2, 1957

2,798,179
SYSTEM FOR REPRODUCING INVISIBLE IMAGES
Edward Emanuel Sheldon, New York, N. Y.

Application January 23, 1952, Serial No. 267,831

14 Claims. (Cl. 313—65)

This invention relates to an improved method and device for intensifying images and refers more particularly to an improved method and device for intensifying images formed by the X-ray radiation, which term is meant to include other invisible radiations, such as gamma rays and the like, and also irradiation by beams of atom particles, such as e. g. neutrons.

The main problem in using X-rays or neutrons for medical diagnosis is the danger of causing damage to the patient by radiation. The danger of over-exposure necessitates the use of a very weak X-ray or neutron beam, which means that the X-ray intensity must be very low and, therefore, we do not have enough of X-ray quanta in the invisible X-ray image of the human body. If we do not use all X-ray quanta, we will not be able to reproduce an image having all the necessary intelligence, no matter how much we will subsequently intensify this image by electronic means. The present X-ray receivers of photoemissive type have a very low quantum efficiency, such as of the order of a fraction of 1% and, therefore, suffer from this basic limitation. The solution of this problem and primary objective of my invention is to provide an invisible radiation receptor, which will utilize all incoming photons of radiation, which means it will have a quantum of efficiency close to unity.

Another object of this invention is to provide a method and device to produce intensified images. This intensification will enable the overcoming of the inefficiency of the present X-ray fluoroscopic examination. At the present level of illumination of the fluoroscopic image, the human eye has to rely exclusively on scotopic (dark adaptation) vision, which is characterized by a tremendous loss of normal visual acuity in reference both to detail and to the contrast. Without intensification of luminosity of at least of the order of 1000, the eye is confined to so-called scotopic vision, at which it is not able to perceive definition and contrast of the fluoroscopic image. It is well known that intensification of the brightness of the X-ray fluoroscopic image cannot be achieved by increase of energy of the X-ray radiation, as it will result in damage to the patient's tissues. Therefore, to obtain the objects of this invention, a special X-ray sensitive pick-up tube and system are necessary.

Another object of this invention is to make it possible to prolong the fluoroscopic examination since it will reduce markedly the total strength of radiation affecting the patient's body. Conversely, the exposure time or energy necessary for the radiography may be reduced.

Another object is to provide a method and device to produce sharper X-ray fluoroscopic and radiographic images than was possible until now.

Another important objective of this invention is to provide a method and device to amplify the contrast of the X-ray image.

The objectives of this invention were obtained by a novel invisible radiation sensitive television system. This system consists of an invisible radiation source, a novel invisible radiation sensitive pick-up tube, amplifiers and receivers for reproducing said invisible image. The novel pick-up tube has X-ray or neutron sensitive composite screen, which consists of a fluorescent layer, a conducting separating layer and a photoconductive layer. The photoconductive layer is a dielectric, which becomes electrically conductive when irradiated by light. The invisible X-ray of neutron image produces, therefore, in the invisible radiation sensitive screen a fluorescent light image. The fluorescent light acts on a photoconductive layer and creates therein a pattern of electrical conductivity changes, as well as a pattern of electrical potentials on the surface of said conductive layer. The latter process has a high quantum efficiency such as approaching unity. The electrical conductivity changes and the electrical potentials on the surface of the conductive layer have the pattern of the X-ray or neutron image. It is to be understood that the electrical conductivity changes and potential changes occur in materials used for my perforated photocathode or screen simultaneously and that they are interdependent (so that these both phenomena cannot be separated from each other). It is further to be understood that these both phenomena are to be considered as equivalent for the purposes of this invention. They cannot, however, be used directly for reproduction of a visible image with the necessary intensification. They are used in my invention to modulate a strong uncontrolled electron beam. The modulated electron beam will have, therefore, the pattern of the original X-ray or neutron image. This electron beam can be accelerated, electron-optically diminished and converted into video signals which are used to reproduce a visible image with necessary intensification.

In another modification of my invention, the novel invisible radiation sensitive image tube has X-ray or neutron receiving screen only of a dielectric material, which exhibits property of becoming conductive and producing electrical charges and potentials directly in response to X-ray or neutron beam. The invisible X-ray or neutron image produces within said invisible radiation sensitive screen a pattern of electrical conductivity changes and on the surface of said screen a pattern of electrical potentials with a high quantum efficiency, such as approaching unity. The electrical conductivity changes and potentials have the pattern of the X-ray or neutron image. The theory and explanation of this phenomenon is given by the article of S. G. Zizzo and J. B. Platt "Detection of X-ray quanta by a cadmium-sulphide crystal counter," Physical Review, volume 75, September 1, 1949, page 704. It is believed that energetic X-ray photons striking X-ray sensitive dielectric materials are able to remove an electron from its place in the matter. The deficiency of an electron can be considered as a positive particle, which is also called a positive hole. Electrons and positive holes move across said insulator under the influence of electrical field applied by means of conducting electrodes. The electrons and positive holes, therefore, produce within the invisible radiation sensitive screen, a pattern of electrical charges and of electrical conductivity changes with a high quantum efficiency such as approaching unity. At the same time, a pattern of electrical charges and potentials is formed on the surface of invisible radiation sensitive screen. The electrical charges, the conductivity changes, as well as potentials pattern have the pattern of the X-ray or neutron image. They cannot, however, be used directly for reproduction of a visible image with the necessary intensification. In my invention they are used to modulate an electron beam, which irradiates this electrical pattern on said screen. The modulated electron beam will have, therefore, the pattern of the original X-ray or neutron image. This electron beam is converted into video signals. Video signals are sent to amplifiers. By the use of variable mu-amplifiers in one or two stages, intensification of video signals can be produced in non-linear manner, so that small differences in intensity of succeeding video signals can be increased one to ten times, producing thereby a corresponding gain of the contrast of the final visible image in receivers, which was one of the objectives of this invention. Amplified video signals are transmitted to kinescopes to reproduce a visible image with necessary intensification.

In some cases, it may be necessary to include a special storage tube in the invisible radiation image intensifying system, in order to overcome the flicker resulting from too long a frame time. In such case, video signals are sent to the storage tube having a special dielectric storage target and are deposited there by means of modulating electron scanning beam of said storage tube. The stored electrical charges having the pattern of X-ray image, are released from said electrode, after predetermined time, by scanning it with another electron beam or, in a modification of the storage target having photoemissive elements, by irradiating it with light. The released electron image is converted again into video signals and sent to final receivers to produce invisible image with desired intensification and gain in contrast and sharpness.

In this way, all purposes of the invention were accomplished. The invisible X-ray image is converted into video signals without any loss of information because of quantum efficiency of the X-ray sensitive layer and the resulting video signals are intensified to give the necessary brightness of reproduced X-ray image.

It is obvious that my invention is not limited to ionizing radiations such as X-rays or neutrons, but it may also be used for other invisible radiations, such as infra-red or ultra-violet, or for reproduction of supersonic images.

The invention will appear more clearly from the following detailed description when taken in connection with the accompanying drawings which are, by way of example, only preferred embodiments of the inventive idea.

In the drawings:

Figure 1 is a cross-sectional view of the invisible radiation image intensifying system.

Figures 1a, b, c, d, and e are diagrammatic cross-sectional views of modifications of the invisible radiation sensitive photocathode in the pick-up tube.

Figure 2 is a cross-sectional view of the invisible radiation image intensifying system showing a modification of the pick-up tube.

Figure 3 is a plan view of the invisible radiation sensitive photocathode.

Figure 4 is a cross-sectional view of a modification of the invisible radiation sensitive pick-up tube having a simplified photocathode.

Figure 5 is a cross-sectional view of the image intensifying system showing the use of a storage tube.

Reference will now be made to Fig. 1, which illustrates the novel X-ray or neutron sensitive image tube 1. The X-ray source 2 produces an invisible image 3 of the examined body 4. The invisible image passes through the face 5 of the tube, which obviously must be of material transparent to the radiation used and may be flat or convex in shape and strikes the composite perforated photocathode 6 disposed inside of the pick-up tube 1. The composite photocathode 6 which is also shown in Fig. 3, consists of a conducting mesh screen 7, which has a high percentage of openings therein, a light reflecting, electron impervious layer 8a, a fluorescent layer 8, a very thin light transparent conducting layer 9 and a photosensitive layer 10. The mesh screen 7 may be of aluminum, gold, silver or platinum and must be very thin and have a large percentage of open spaces, in order not to absorb the invisible image. It can be made of a fine wire or of a thin perforated metal sheet, or of a perforated glass coated with "Nesa". The layer 8a may be of mica, aluminum, gold or silver, and must be very thin in order to be transparent to the invisible radiation image 3. The layer 8 may be made of various sulphides, selenides, silicates, organic phosphors, such as stilbene or anthracene, of tungstates, ZnO or $BaPbSO_4$. For neutron images, the fluorescent layer should be activated with elements which have a large cross-section for neutrons, such as boron, lithium, gadolinium or an additional neutron sensitive layer, such as of boron, lithium or gadolinium, should be disposed adjacent to fluorescent layer.

Better definition will be obtained by the use of evaporated phosphors, which have no grain structure and, therefore, are suitable for reproducing images of high definition. Such phosphors were described in the article published in the Journal of the Optical Society, August 1951, page 559.

The conducting layer 9 must be transparent to fluorescent light and must be exceedingly thin in order not to impair resolution of the image. I found that the maximum thickness of the conducting layer, which separates fluorescent and photoconductive layers, must be less than 0.25 millimeter, in order to reproduce an image of diagnostic value. The conducting layer may be of gold, silver, platinum, silicates, or may be of material, such as plastic, glass or mica, coated with the conductive layer, such as known under the trade name "Nesa" and manufactured by Pittsburgh Glass Company. The photosensitive layer 10 may be of CdS or other sulphides, $Sb_2S_3$ or other antimonides, selenium, ZnSe or other selenides. Many sulphides, selenides, iodides, arsenides and oxides exhibit radiation induced conductivity effect and may be used for the purposes of my invention.

The light reflecting layer 8a, the fluorescent layer 8, the conducting light transparent layer 9 and the photosensitive layer 10 are deposited on the mesh screen 7, so that the openings 11 of said screen 7 remain unobstructed, as shown in Fig. 3. The conducting mesh screen 7 serves here as a support for the other layers of the composite photocathode 6. In some applications, the conducting layer 9 may be used preferably as a supporting layer. In such a case, it is made of a fine mesh screen or of perforated metal sheet or of a perforated glass coated with "Nesa," which can be attached to the walls of the tube by means of metal rings. The construction of this type of perforated photocathode 6a is illustrated in Fig. 1a, which shows the supporting layer in this embodiment of my invention to be the layer 9a. The fluorescent layer 8 is deposited on one side of the conducting layer 9a, whereas the photosensitive layer 10 is deposited on the other side. The perforated photocathodes 6 and 6a may be improved by providing a thin perforated light reflecting electron impervious layer 8a adjacent said fluorescent layer in order to protect said fluorescent layer from the exposure to the electron beam. The photocathodes 6 and 6a may be disposed in the image tube 1, so that they are facing the invisible radiation image with the fluorescent layer 8. Also, the reverse arrangement, in which the photosensitive layer 10 is facing the invisible radiation image, may be used for the purposes of this invention, as illustrated in Figs. 1b and 1c.

Fig. 1b shows the photocathode 6b, in which the photosensitive layer 10 faces the source of invisible radiation. Next to it, there are the conducting supporting mesh screen 9a, the fluorescent layer 8 and the light reflecting layer 8a. This type of the perforated photocathode can be used well for X-ray or neutron images, which can easily penetrate through the thin photosensitive layer 29, but it is not suitable for infra-red images. The photocathode may also have construction in which the supporting layer is the mesh screen 7, as illustrated in Fig. 1c.

The invisible radiation image produces in the fluorescent layer 8, a fluorescent light image having the pattern of said invisible image. The fluorescent image produces within the photosensitive layer 10 a pattern of changes in electrical conductivity and on the surface of said photoconductive layer, a pattern of changes and potentials according to the pattern of said fluorescent light image. The photoconductive layer 10 is under the influence of an electrical field produced by an extrinsic source of electrical power, such as battery 12, which is connected to the conducting layer 9. Under the influence of this electrical field, the electrons and positive holes liberated in the photoconductive layer 10 by the impingement of fluorescent light from the layer 8, and in some cases also of the X-ray or neutron beam, move across the layer 10. Therefore, the pattern of potentials having the pattern of the original invisible radiation image appears on the uncovered surface of the photo conductive layer 10. In some cases, better results are obtained by using a pulsating electrical field instead of a battery. In particular, applying a square wave voltage of a low frequency, such as 15–30 cycles per second to the conducting layer 28 will improve the sensitivity of the photocathode markedly and will prevent "fatigue" effects. The composite perforated photocathode 6 is irradiated by a broad beam of electrons 16 from the electron gun 20. The electron beam 16 is slowed down preferably in front of the photocathode 6 by the action of decelerating electrode, which may be in the form of a ring or mesh screen. The electron beam 16 is bent by a suitable magnetic or electrostatic field 51 and is focused on the perforated photocathode 6. The passage of the broad electron beam 16 through the openings 11 in the perforated photocathode 6 is controlled by the potentials present around said openings, which are due to the action of the invisible radiation image. In particular, the more positive the potentials around the openings 11, the more electrons of beam 16 will be transmitted. The more negative the potentials, the fewer electrons will be transmitted through the openings. In this way, the potential image in the photocathode 6, which corresponds to the invisible radiation image, modulates the electron beam 16. The transmitted electron beam 16a will have, therefore, the pattern of the original invisible image. Next it is accelerated by means of high voltage electrostatic or electromagnetic field 21, which may have the form of ring electrodes or of conducting coating on the wall of the tube to a desired velocity, producing in this manner intensification of the electron image. The electron image 16a is focused by electrostatic or electromagnetic field 18. The electron accelerating and focusing electrodes are well known in the art. It is believed, therefore, that they do not have to be described in detail in order not to complicate the drawings. Next, the electron image 16a is electron-optically diminished by means of electron lenses, which results in image intensification proportional to the square power of its linear diminution and is projected on the storage target 22.

The transmitted electron beam 16a strikes the storage target 22 with velocity sufficient to produce secondary electron emission from the target 22 higher than unity. The secondary electrons are collected by the adjacent mesh screen 23 and are led away. As a result, a positive charge pattern remains in the semi-conductive target 22. The target 22 may be of mica, silica or glass and must be very thin, such as from 0.5–100 microns. The positive charge image, because of thinness of target 22 can migrate to its opposite side in less than 1/30 second. This time depends on resistivity of the target and may be selected as desired for purposes of invention. The electron gun 13 is adjusted to produce a fine electron beam 17 to scan the target 22 in television-like raster. The electron beam 17 is focused by focusing magnetic or electro-static coil 45 and by the alignment coil 45a, which are well known in the art and, therefore, are not described in detail in order not to complicate the drawings. The electron beam 17 is deflected by deflecting coils 46 and scans the target in the usual television manner. The electron beam 17 is slowed down in front of the target 22 by decelerating electrode, which may be in the form of a ring or mesh screen. A high velocity electron beam may be used also in this invention. The slow electron beam 17 is modulated by the pattern of positive electrical charges on the target 22. The returning electron beam 17a carries, therefore, image information, is directed now to multipliers 49 and strikes the first stage 49a of multiplier. The secondary electrons produced by impingement of electron beam 17a are drawn to the next stage 49b of the multiplier 49, which is around and in the back of the first stage. This process is repeated in a few stages, resulting in a marked multiplication of the original electron signals. The signal currents from the last stage of the multiplier are converted over a suitable resistor into video signals. Video signals are fed into television amplifiers 72 and then are sent by coaxial cable 73 or by high frequency waves to the receivers of kinescope type 74 or facsimile type, in which they are reconverted into visible images for inspection or recording. The synchronizing circuits are not shown as they are well known in the art and would only complicate drawings.

A very important feature of my novel X-ray or neutron sensitive image tube is that it can be operated as a storage tube. This means that after the invisible image is formed in the photocathode 6 as a pattern of electrical conductivity changes or of electrical potentials, X-ray or neutron radiation may be shut off and the image may be read for the desired time. This results in a great reduction of X-ray or neutron exposure of patients, which was one of the primary objectives of my invention. The operation of the image tube 1 or 24 as a storage tube is essentially the same as described above, except that X-ray or neutron radiation may be stopped after one short exposure. The storage effect of my image tube is due to photoconductive lag observed in insulators, such as selenium, cadmium sulphide or antimony trisulphide and others when the incident light is of a low intensity. Such conditions prevail in medical fluoroscopy where the brightness of fluorescent light image produced in layer 8 by X-ray or neutron image is in the range of 0.01–0.001 foot-candle. The photoconductive lag means that conductivity pattern within the layer 10 and potential pattern on the uncovered surface of said photoconductive layer persists for many seconds. During all this time, the electron beam 16 can be modulated by said conductivity or potential pattern and will be building up a charge image corresponding to the original X-ray or neutron image in the storage target 22. The photoconductive lag may be prolonged by refrigerating the photoconductive layer 10 of the photocathode, or by addition of suitable impurities, such as Cu when using CdS for a photoconductive layer.

Another important advantage of my X-ray or neutron sensitive tube resides in the efficiency of the photoconductive layer as compared with the previously used photoemissive layer. Whereas the best photoemissive materials have quantum efficiency of the order of 3 to 5%, the photoconductive layer 10 has quantum efficiency close to unity or even exceeding unity. The efficiency of photoconductive layer 10 can also be increased by providing a strong electrical field across it, which serves to move liberated electrons and positive holes across said layer.

In a modification of my invention as shown in Fig. 1d, the potential pattern of the uncovered side of the photoconductive layer 10 is intensified by disposing in close proximity to said uncovered side, a mesh screen 26, which is connected to one terminal of the battery 12; the other terminal of the battery is connected to conducting layer 9a. In this way, a strong electrical field is produced across layer 10. In another modification of my invention shown in Fig. 1e, instead of a mesh screen, a discontinuous mosaic 34a of conducting particles, such as gold, platinum or silver is deposited on the uncovered side of the photoconductive layer 10 to provide the second terminal for battery 12 for producing a strong electrical field across layer 10. The response of X-ray or neutron sensitive layer 8 may be increased by irradiation of said layer with a green light simultaneously with X-ray or neutron exposure. In some cases, the use of infra-red or ultra-violet is preferable.

The larger the dark resistance of the photoconductive layer, the larger will be the potential pattern on its surface for modulating the electron beam 16. In order to obtain both high photosensitivity and high resistance, photoconductive layer 10 may be made of two adjacent layers, such as one of a photoconductive material highly responsive to fluorescent light from layer 8 and one of having high resistance for storage of charges liberated in the first layer. A suitable combination for such composite photoconductive screen is a thin layer of selenium deposited on the top of a thin layer of cadmium sulphide or of antimony trisulphide.

In a modification of my invention shown in Fig. 2, the composite photocathode faces the X-ray or neutron image with the photoconductive layer 10. In this embodiment of invention, the electron gun 20 producing electron beam 16 is disposed in the axis of the tube. The transmitted electron beam 16a is bent by suitable magnetic fields 52 and is projected on the storage target 22a, which has been described above. The electron image 16a is stored in said target as a charge image, as was explained above. It is then scanned by electron beam 41 from the electron gun 42. The electron beam 41 is slowed down in front of the storage target 22a. The rest of the operation of the tube 24 is the same as was described above for tube 1. The electron beam 41a returning after scanning said stored charge image, is converted into video signals. Video signals are amplified and are transmitted to receivers to reproduce a visible intensified image.

Further improvement of operation of my invisible radiation sensitive image tube may be obtained by a better conversion of invisible radiation into electrons and positive holes in the photocathode. The previously described photocathode 6 had a serious deficiency, namely, the conversion of X-ray or neutron image into fluorescent image in layer 8 had only 3% quantum efficiency. By using photocathode of a material which responds directly to X-ray or neutron radiation with quantum efficiency of unity, a thirty-fold additional increase in sensitivity of my system for invisible radiation images was obtained. This embodiment of invention is shown in Fig. 4.

The invisible radiation sensitive tube 35 has a perforated composite photocathode 36 sensitive to X-rays or neutrons. The layer 37 of the composite photocathode 36 is a conducting mesh screen, such as of aluminum, gold, silver or platinum. The layer 38 is deposited on the mesh screen 37 in such a manner as not to obstruct openings 11 therein. The layer 38 is of a dielectric material, which has the property of becoming conductive and producing a current of electrical charges (electrons and positive holes) in response to X-ray or neutron radiation. The electrical field across the layer 38 is provided by a source of electrical power, such as battery 12. Better results are attained by using a pulsating electrical field instead of a direct current from battery. In particular, applying a square wave voltage of a low frequency, such as 15–50 cycles per second to the conducting layer 37, will markedly improve the sensitivity of the photocathode 36 and will prevent fatigue effects. Instead of mesh screen in the composite photocathode, a perforated metal sheet or a perforated glass sheet coated with a conducting layer of "Nesa" may be used as well. One terminal of the battery is connected to layer 37, another terminal to the conducting coating inside of the tube. An improvement in operation of electrical field across the layer 38 may be obtained by using as a second terminal for the battery 12, an additional mesh screen 26 in close spacing to layer 38, as shown in Fig. 1d. Also, the arrangement shown in Fig. 1e, where a discontinuous mosaic of conducting particles, such as gold, platinum or silver, was applied as an electrode for the second terminal of battery, may be used for this purpose. The impingement of the X-ray or neutron beam on the layer 38 produces therein two different effects, a pattern of electrical conductivity changes within the layer and a pattern of potentials on its surface, both of which correspond to the original invisible image. By proper choice of X-ray or neutron sensitive material, these two effects may be made to work in the same direction and improve modulation of the irradiating electron beam.

It is obvious that photocathode 36 may also be used in the tube 1, illustrated in Fig. 1 and, in the tube 24 shown in Fig. 2.

The X-ray or neutron image is converted by said photocathode 36 into a pattern of electrical charges or potentials. It is believed that energetic X-ray photons striking X-ray sensitive dielectric materials are able to remove an electron from its place in the matter. The deficiency of an electron can be considered as a positive particle, which is also called a positive hole. Electrons and positive holes move across said insulator under the influence of electrical field. The electrons and positive holes form, therefore, a current of electrical charges produced by X-rays. Such invisible radiation sensitive materials are CdS, diamond, quartz, MgO, ZnS, alkali halides or antimony compounds.

The X-ray or neutron image 3 of the examined body 4 strikes the photocathode 36 and produces therein a current of electrical charges having the pattern of the examined body, as explained above. Photocathode 36 has quantum efficiency for X-rays close to unity. Therefore, the X-ray image is converted into pattern of electrical charges or potentials without any loss of information, in contradistinction to the operation of photoemissive X-ray or neutron receivers. The efficiency of the response of layer 38 to the X-ray or neutron beam can be markedly increased by irradiating layer 38 with red or infra-red light at the time of the X-ray or neutron exposure. Some CdS crystals respond better to green light irradiation as it reduces their lag.

An electron gun 20 producing a broad beam 16 of electrons is disposed within the image tube to provide a strong uncontrolled beam of electrons. The beam of electrons is projected on the X-ray and neutron sensitive composite photocathode 36. In some cases, it is preferable to decelerate the electron beam 16 before it impinges on the photocathode 36. A ring-like electrode 53 or a mesh screen may serve for this purpose. The electron beam 16 is bent by a suitable magnetic field 52 and is projected on the perforated photocathode 36. The photocathode 36 has a pattern of charges or potentials thereon, which corresponds to the original invisible radiation image. The passage of electrons from the electron gun 20 through said perforated photocathode 36 depends on potentials present around its openings. The transmitted electron beam 16a is modulated by the pattern of said potentials and will have, therefore, the pattern of the original invisible radiation image. The transmitted electron beam 16a is now accelerated by means of high voltage electrostatic or electromagnetic fields 21, which may have the form of ring electrodes, or of a conducting coating inside of walls of the tube to the desired velocity, producing in this manner intensification of the electron image. The electron image is focussed by electrostatic or electromagnetic fields 18. The accelerating and focusing electrodes are well known in the art. It is believed, therefore, that they do not have to be described in detail in order not to complicate the drawings.

Next, the electron image is diminished by means of electron lenses to the desired size, resulting in image intensification proportional to the square power of the linear diminution and is projected on the storage target 22 to be stored therein as a charge image. The rest of the operation of invisible radiation sensitive pick-up tube 35 is the same as was described above for the tubes 1 and 24. The scanning electron beam 55 produced by electron gun 56 is decelerated in front of the target 22 by a ring electrode 57. Also, a mesh screen may be used for this purpose. The electron beam 55 is focused by focusing electrostatic or electromagnetic coil 45 and by the alignment coil 45a, which are well known in the art, and, therefore, are not described in detail in order not to complicate drawings. The electron beam 55 is deflected by deflecting coils 46 and scans the target 22 in the usual television manner. The scanning electron beam neutralizes the positive charges produced in target 22 by electron beam 16a. Therefore, the scanning beam 55a, which returns to the electron gun 56, is modulated by the pattern of said charges and carries video information. This novel arrangement makes it possible to obtain much better results than the previously known systems, because the quantum efficiency of the novel photocathode 36 approaches unity, whereas the best quantum efficiency of fluorescent materials in combination with photoemissive materials is only a fraction of 1%. The returning electron beam 55a strikes the first stage 49a of the electron multiplier 49. The secondary electrons from the first stage of the multiplier strike the succeeding stage 49b around and in back of the first stage. This process is repeated in a few stages resulting in a marked multiplication of the original electron signals. The signal currents from the last stage of the multiplier are converted over a suitable resistor into video signals and are fed into television amplifiers 72. Video signals, after amplification, are sent by coaxial cable 73 or by high frequency waves to the receivers of kinescope type 74, facsimile or skiatron type in which they are reconverted into a visible image 75 for inspection or for recording. In order to obtain amplification of contrast of the X-ray image, the amplifiers 72 are provided with variable mu tubes in one or two stages. Small differences in intensity of the succeeding video signals are increased by variable mu tubes in non-linear manner, resulting in a gain of the contrast of the visible image in receivers. The synchronizing circuits are not shown, as they are well known in the art and would complicate drawings.

The response of photocathode 36 may be increased by irradiating X-ray sensitive layer 38, if it is of cadmium sulphide with green light. Also, addition of activators, such as Ag, increases sensitivity of CdS. Some cadmium sulphide crystals respond better to infra-red stimulation; some, on the contrary, lose their sensitivity when irradiated by infra-red light. If the X-ray sensitive layer is of diamond, the irradiation with infra-red light or with ultra-violet light will increase its sensitivity. Some X-ray or neutron sensitive materials have the best sensitivity when refrigerated. For example, silver chloride must be kept at the temperature of liquid air to be responsive to X-rays. Diamond performs well at room temperature; however, a marked increased of its sensitivity is observed when it is kept at the temperature of 200° K. Also, sensitivity of CdS increased markedly on cooling.

Some X-ray sensitive materials show a considerable lag, i. e., persistence of conductivity after being irradiated by X-ray or neutron image. This lag effect may be used to operate image tube 35 as a storage tube. The conductivity lag means that conductivity pattern in the layer 38 and potential pattern on the uncovered surface of said layer 38 will persist for many seconds after the exciting X-ray or neutron radiation has been stopped. During all this time, the beam 16 will be modulated by said pattern and will continuously produce a charge image corresponding to the original X-ray or neutron image in the storage target 22. I discovered that repeated irradiation with electron beam does not discharge conductivity or potential pattern stored in layer 38. Therefore, reproduced image can be read for a long time without maintaining X-ray or neutron radiation. This results in a large reduction of the total X-ray or neutron exposure affecting the patient. The pick-up tubes 1, 24, 35 or 60 may also serve for storage of images in a different manner. If the energy of the scanning electron beam is selected so that it is not sufficiently strong to neutralize the electrical charges in the storage target 22 or 22a in one scan, then the stored image will persist for a long time. By proper selection of intensity of the scanning beam and of the capacity and resistance of storage target, the charge image can be stored and read in said target for many seconds. In such case, the target should be of material having high resistance, such as precipitated silicon, $CaF_2$, $BaF_2$, glass or mica.

Addition of suitable impurities, i. e., activators, to the X-ray or neutron sensitive layer, will markedly change its conductivity lag and time necessary to arrive at equilibrium. Also, changes of temperature have similar effects. In particular, the conductivity lag may be prolonged by refrigerating the layer 38 of the photocathode.

As was explained above, my invisible radiation sensitive image tubes 35 or 60 may also be used for storing and reproducing images formed by infra-red radiation. In such a case, the invisible radiation sensitive layer 38 should be of a material sensitive to infra-red rays. In particular, sulphides, tellurides or selenides of lead, bismuth or thallium or antimonides will be best for the infra-red radiation up to 5 microns wave-length. I found that for longer infra-red waves, such as above 5 microns, BaO or certain compounds of titanium, such as barium titanate or trititanate or dioxide of titanium are very efficient.

It is obvious that image tubes 1, 24 or 35 described above, may also be adapted for direct reproducing of invisible images in a visible form without transmitting them to receivers. In such case, the electron beam irradiating the photocathode 6 or 36, after being modulated by the potential pattern produced by invisible radiation in said photocathode, is focused on a fluorescent screen disposed in the same tube. The impingement of said modulated electron beam on a fluorescent screen will produce a fluorescent image having the pattern of the original invisible radiation image.

In modification of my invention shown in Fig. 5, the invisible radiation image 3 is projected onto the pick-up tube 60. The invisible radiation sensitive tube 60 has photocathode 36, which has the same construction as photocathode used in the tube 35, illustrated in Fig. 4. The invisible radiation image produces in the dielectric layer 38 a current of electrons and "positive holes," as was explained above, which has the pattern of said invisible image. The charges migrate to the side of the layer 38 and produce a potential and charge pattern on its surface. The photocathode 36 is irradiated by electron beam 61 from the electron gun 59. The electron beam 61 is modulated by the conductivity and potential pattern on the photocathode 36. The transmitted electron beam 61a carries, therefore, image corresponding to said pattern. The transmitted electron beam 61a, after intensification by acceleration and by electron-optical diminution, is projected on the storage target 22, as was explained above. The storage target is scanned by electron beam 64 from the electron gun 65. The scanning electron beam 64 is given helical motion, which means an additional transverse velocity. This is accomplished by the use of two electrodes 67 and 68 disposed on both sides of the scanning beam 64. The electrodes 67 and 68 are provided with a positive potential from an extraneous source of electrical energy. The helical motion may also be produced in other ways, such as, for example, by misalignment of the electron gun 65 in relation to the axial focusing field. The scanning electron beam is decelerated in front of the storage target 22 by means of a ring electrode or preferably by using a mesh screen. The scanning electron beam 64 neutralizes the positive charges in target 22 and is, therefore, modulated by said pattern of the electrical charges. The returning electron beam consists of two different groups of electrons. One of them, 64b, is made of electrons reflected by the target 22, whereas the other group 64a is formed by scattered electrons. The reflected electrons correspond to dark areas of the picture. The scattered electrons correspond to the light areas of the picture, because the light areas produce stronger charges on the target. The returning electron beam, consisting of these two different groups of electrons, is deflected from the original path of the scanning beam 64 by electrodes 69 and 70. These electrodes may be planar or curved and do not have to be described in detail, as they are well known in the art.

In front of the electron gun 65, there is disposed cylindrical electrode 71, which pulls the secondary electrons from the first multiplying dynode 49a into the multiplier 49. A disc 71a is connected with the electrode 71 or forms a part of it. The disc 71a has an opening 71b, which may be of a circular or rectangular shape. The electrodes 69 and 70 cause displacement of the returning electron beam downwards. As was explained above, the scattered electrons 64a, having larger transverse velocity than the reflected electrons, are outside of the beam of the reflected electrons 64b. Therefore, by depressing the returning electron beam by electrodes 69 and 70, the reflected electrons may be directed against the disc 71a below its aperture 71b and will be eliminated, whereas the scattered electrons will be admitted into aperture 71b. In this way, both groups of electrons may be separated from each other. The scattered electrons, after passing through the aperture 71b, strike the first dynode 49a of the multiplier 49. The secondary electrons are drawn by the action of the electrode 71 to the next stage of the multiplier, which is around and in the back of the first stage. This process is repeated in a few stages, resulting in a marked multiplication of the original electron signals. The signal currents from the last stage of the multiplier are converted over a suitable resistor into video signals. The strongest video signals will correspond to the highlights of the picture, because the strongest scattering of electrons takes place at the most positively charged areas of the storage target 22. In front of the storage target 22 in some cases, there may be disposed a mesh screen, which provides a uniform electrical field for improving resolution of the picture. Video signals are fed into television amplifiers 72 and then are sent by coaxial cable 73 or by high frequency waves to the receivers of kinescope type 74 or facsimile, in which they are reconverted into visible images 75 for inspection or recording.

The pick-up tube 60 may operate as a storage tube by exploiting the photoconductive lag of the photocathode 36, as was described above.

A great improvement in the operation of the X-ray or neutron image intensifying system may be obtained by the use of a special storage tube for video signals. By the use of storage tube, the scanning time in the X-ray pick-up tube can be prolonged, as well as the frame time, resulting in a proportionally greater electron image build-up in the target 22 and better signal to noise ratio. Also, the flicker caused by prolongation of frame time can be in this way successfully eliminated.

Another advantage of the use of the storage tube in the X-ray intensifying system is the reduction of total X-ray exposure, which is given to the patient, because X-ray radiation does not have to be maintained any more while studying the X-ray image. This saving of the X-ray exposure will make it possible to use strong but short bursts of X-rays or neutrons without endangering the patient. The possibility of using a strong X-ray or neutron beam will markedly improve signal to noise ratio of the whole system and will, therefore, make it possible to obtain pictures of good detail and contrast even of the thickest part of the body.

The X-ray image in the form of the video signals is sent from any of the X-ray pick-up tubes described above to the storage tube 77 and is deposited there in the form of electric charges, by means of modulating the scanning electron beam 78 of said storage tube, in a special target 79, in which it can be stored for a predetermined time, as illustrated in Fig. 5.

The storage target 79 consists of a thin perforated sheet of metal or other conducting material, or of a woven conducting wire mesh 79a. On the side of the target opposite to the electron gun, there is deposited by evaporation storage material 79b in such a manner that openings 80 in the target should not be occluded. In some cases, on the side of the target facing the electron gun, there is deposited by evaporation, a thin metal coating to prevent leakage of charges. The scanning electron beam 78 is produced in the storage tube 77 by the electron gun 81 and is modulated by incoming video signals from the X-ray pick-up tube 60. The scanning electron beam is focused and deflected to produce television-like raster by electromagnetic or electrostatic means, which are well known in the art. This scanning electron beam should have the finest spot compatible with the required intensity of beam. Between the electron gun and storage target 79, in close spacing to the target, there is mounted a fine mesh conducting screen 83. On the opposite side of the storage target, there is disposed a metal electrode 84, which acts as an electron mirror during the writing phase of operation and as a collector of the electrons during the reading phase.

The scanning beam is decelerated between the screen 83 and the target 79. Then it passes through the openings 80 in the target 79. The reflector electrode 84 during writing is kept at the potential negative in relation to the cathode of the electron gun 81. Therefore, the electrons of the scanning beam are repelled by it, fall back on the storage target 79 and deposit thereon varying charges at successive points according to the amplitude of modulating input signals from the X-ray pick-up tube 60. The best way of operating my system is to have the storage surface at zero potential or at cathode potential and then to write on it "positive," which means to deposit positive charges. This can be accomplished by adjusting the potential of the surface of the storage target, so that its secondary emission is greater than unity. The secondary electrons will be collected by the conducting mesh 79a of the storage target or by coating on walls and positive charges will be left on the storage surface. These positive charges deposited on the storing surface of the target may be stored thereon for many hours depending on the type of the storage material 79b which was used. Whereas $BaF_2$ has a time constant of 0.1 second, $CaF_2$ has the time constant of 50 hours.

When the stored image is to be read, the potential of the electron reflector 84 is made more positive than the potential of the storage screen mesh 79a, so that it will act now as a collector of electrons. Therefore, the scanning electron beam 78, after passing through the perforations 80 in the target 79 will land on the collector 84. The passage of the scanning electron beam is modulated by the pattern of deposited charges on the storage target. The greater the positive charge, the more electrons will pass through the openings 80 in the target. The less positive the stored charge, the fewer electrons will be transmitted through these openings. In this way, the electron beam 78 scanning the storage target in the usual television-like raster, will be modulated by the stored image. The transmitted electrons will be collected by the collector 84 and will be converted over suitable resistor into video signals 85. The transmitted electrons may also be multiplied by using as a collector 84 an apertured electrode and deflecting fields to make said electrons pass through aperture 84a in said electrode in succession and to be fed into multiplier 86 before converting them into video signals. This multiplication system is well known in the art, as evidenced by image dissector of Farnsworth and, therefore, does not have to be described in detail. Video signals, having the pattern of the original X-ray or neutron image, are amplified and transmitted by coaxial cable 73 or by high frequency waves to receivers. Receivers of various types, such as kinescopes 74, skiatrons, facsimile receivers, electrographic cameras, may be used to reproduce images for inspection or recording. Also, the not-transmitted, returning electrons 78a may be used for producing video signals.

After the stored image has been read and no further storage is desired, it may be erased by the use of the scanning electron beam 78 and by adjusting the potential of the storage target to the value at which the secondary electron emission of its storing surface is below unity. In such a case, the target will charge negatively to the potential of the electron gun cathode. The potential of the reflector in the erasing phase of operation must be more negative than of the storage target, so that the scanning electron beam will be repelled to the storage target and will neutralize the stored positive charges.

It is obvious that my system of intensification of X-ray or neutron images may be used not only for medical examinations, but for industrial testing or X-ray diffraction studies as well.

It will thus be seen that there is provided a device in which the several objects of this invention are achieved, and which is well adapted to meet the conditions of practical use. As various possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A vacuum tube having a perforated screen for receiving an invisible radiation image, said screen comprising a perforated layer of material converting said image into electrical conductivity changes having the pattern of said image, means for irradiating said screen with a beam of electrons to modulate the transmission of said electron beam with said conductivity changes, means for receiving said modulated electron beam and converting said beam into a stored charge pattern, means for producing a second electron beam, means for scanning with said second beam across said stored charge pattern to modulate said second electron beam with said stored charge pattern, means for receiving electrons of said modulated second electron beam and means for converting said received electrons into video signals.

2. A device, as defined in claim 1 in which, said perforated screen comprises in addition a perforated electrically conductive layer in contact with said layer of material converting said image into electrical conductivity changes, the perforations of all aforesaid layers being substantially in alignment with each other.

3. A device, as defined in claim 1, in which said perforated layer is of material reactive to an ionizing radiation.

4. A device, as defined in claim 1, in which said perforated screen for receiving said invisible radiation image comprises a perforated fluorescent layer, a perforated light transparent conducting layer and a perforated photosensitive layer in contact with said conducting layer, the perforations of all aforesaid layers being in alignment with each other.

5. A device, as defined in claim 1, in which said perforated screen comprises a perforated supporting layer, a perforated fluorescent layer, a perforated light transparent conducting layer and a perforated photosensitive layer in contact with said conducting layer, the perforations of all aforesaid layers being in alignment with each other.

6. A vacuum tube having a perforated screen for receiving an invisible radiation image, said screen comprising a perforated layer of material converting said image into electrical conductivity changes having the pattern of said image and storing said electrical conductivity changes, means for irradiating said stored conductivity changes with a beam of electrons to modulate the transmission of said electron beam through said screen with said stored conductivity changes, means for converting said modulated beam into a stored charge pattern, means for producing a second electron beam for scanning said stored charge pattern, means for receiving electrons of said second electron beam and means for converting said received electrons into video signals.

7. A vacuum tube having a perforated screen for receiving an invisible radiation image, said screen comprising a perforated layer of material converting said image into electrical potential changes having the pattern of said image, means for irradiating said screen with a decelerated beam of electrons to modulate the transmission of said electron beam through said screen with said potential changes, means for receiving said modulated electron beam and converting said beam into a stored charge image, means for producing a second electron beam and scanning with said second beam across said charge image to modulate said second electron beam with said charge image, means for receiving electrons of said modulated electron beam and means for converting said received electrons into video signals.

8. In a device, as defined in claim 7, said perforated layer being of material reactive to an ionizing radiation.

9. A tube containing in combination a perforated screen comprising a perforated layer of material converting an image into electrical conductivity changes having the pattern of said image and a perforated fluorescent layer in contact with said perforated layer of material converting an image into electrical conductivity changes, the perforations of all aforesaid layers being in alignment with each other, means for producing an electron beam, means for decelerating said electron beam and means for irradiating with said beam said perforated screen.

10. A device as defined in claim 9, wherein said layer having the property of producing electrical conductivity changes has one surface uncovered.

11. A tube containing in combination a perforated screen comprising a perforated fluorescent layer and a perforated photoconductive layer in contact with said fluorescent layer, the perforations of all aforesaid layers being in alignment with each other, means for producing an electron beam, means for decelerating said electron beam, means for irradiating with said beam said screen, and means for receiving electrons of said beam.

12. A device as defined in claim 11, in which said photoconductive layer has one surface uncovered.

13. A tube containing in combination a perforated screen comprising a perforated fluorescent layer and a perforated photoconductive layer in contact with said fluorescent layer, the perforations of all aforesaid layers being in alignment with each other, said photoconductive layer having one surface uncovered, means for producing an electron beam, means for decelerating said electron beam, means for irradiating with said beam said screen, means for receiving electrons of said beam, and means for converting said electrons into video signals.

14. A perforated composite screen comprising a perforated layer of fluorescent material and a perforated layer of material which has the property of producing electrical conductivity changes in response to a radiation, and has one surface uncovered, said layers being in contact with each other and furthermore the perforations in said layers being in alignment with each other.

(References on following page)

References Cited in the file of this patent

UNITED STATES PATENTS

| | | |
|---|---|---|
| 2,240,186 | Iams | Apr. 29, 1941 |
| 2,262,123 | Sukumlyn | Nov. 11, 1941 |
| 2,286,280 | Iams | June 16, 1942 |
| 2,300,591 | Osawa | Nov. 3, 1942 |
| 2,324,534 | Pierce | July 20, 1943 |
| 2,416,720 | Teal | Mar. 4, 1947 |
| 2,525,832 | Sheldon | Oct. 17, 1950 |
| 2,547,638 | Gardner | Apr. 3, 1951 |
| 2,549,072 | Epstein | Apr. 17, 1951 |
| 2,555,424 | Sheldon | June 5, 1951 |